(12) United States Patent
Ben Bakir et al.

(10) Patent No.: US 8,285,102 B2
(45) Date of Patent: Oct. 9, 2012

(54) STRUCTURE OF A MICRONANOSTRUCTURE OPTICAL WAVE GUIDE FOR CONTROLLING BIREFRINGENCE

(75) Inventors: Badhise Ben Bakir, Brégins (FR); Alexei Tchelnokov, Meylan (FR)

(73) Assignee: Commissariat a l'Energie Atomique, Paris (FR)

( * ) Notice: Subject to any disclaimer, the term of this patent is extended or adjusted under 35 U.S.C. 154(b) by 41 days.

(21) Appl. No.: 13/002,286

(22) PCT Filed: Jul. 2, 2009

(86) PCT No.: PCT/EP2009/058368
§ 371 (c)(1),
(2), (4) Date: Feb. 28, 2011

(87) PCT Pub. No.: WO2010/000824
PCT Pub. Date: Jan. 7, 2010

(65) Prior Publication Data
US 2011/0274399 A1    Nov. 10, 2011

(30) Foreign Application Priority Data
Jul. 2, 2008  (FR) ..................................... 08 54488

(51) Int. Cl.
*G02B 6/10*   (2006.01)
*B05D 5/12*   (2006.01)

(52) U.S. Cl. ........ 385/132; 385/129; 385/130; 385/131; 427/75

(58) Field of Classification Search .......... 385/129–132, 385/15, 37; 427/75
See application file for complete search history.

(56) References Cited

U.S. PATENT DOCUMENTS

| | | | | |
|---|---|---|---|---|
| 6,788,866 | B2 * | 9/2004 | Bryan | 385/129 |
| 7,120,334 | B1 * | 10/2006 | Greiner et al. | 385/37 |
| 7,224,882 | B2 * | 5/2007 | Bryan et al. | 385/141 |

(Continued)

FOREIGN PATENT DOCUMENTS
EP    1219983 A2    7/2002
(Continued)

OTHER PUBLICATIONS

Flanders, "Submicrometer Periodicity Gratings as Artificial Anisotropic Dielectrics," Applied Physics Letters vol. 42, No. 6, Mar. 15, 1983, pp. 492-494.

(Continued)

*Primary Examiner* — Brian M. Healy
*Assistant Examiner* — Guy Anderson
(74) *Attorney, Agent, or Firm* — Nixon Peabody LLP

(57) ABSTRACT

A waveguide structure includes a supporting substrate and a waveguide having at least one guide layer with a refractive index n1. This layer comprises a zone of birefringence B which comprises voids provided in the thickness of the guide layer filled with a fluid or material having a refractive index n2. These are organized in at least two parallel rows, each row being in a plane perpendicular to the surface of the guide layer and parallel to the direction of propagation of the optical wave in the guide layer; each row extending over a distance equal to or greater than the wavelength of the optical wave; the width of the voids being $\leq 1/10$th of the wavelength of the optical wave; each void within one row being at a distance from an adjacent void of $\leq 1/10$th of the wavelength of the optical wave.

22 Claims, 4 Drawing Sheets

U.S. PATENT DOCUMENTS

| | | |
|---|---|---|
| 7,292,755 B1 * | 11/2007 | Greiner et al. ............... 385/39 |
| 7,359,597 B1 | 4/2008 | Iazikov et al. |
| 7,437,047 B2 * | 10/2008 | Bryan et al. ............... 385/129 |
| 2001/0012149 A1 | 8/2001 | Lin et al. |
| 2002/0164119 A1 * | 11/2002 | Bryan et al. ............... 385/33 |
| 2003/0035642 A1 * | 2/2003 | Bryan ............... 385/129 |
| 2003/0063884 A1 * | 4/2003 | Smith et al. ............... 385/129 |
| 2004/0184752 A1 | 9/2004 | Aoki et al. |
| 2004/0258355 A1 * | 12/2004 | Wang et al. ............... 385/37 |
| 2005/0094956 A1 | 5/2005 | Parker et al. |
| 2006/0280396 A1 | 12/2006 | Wu |
| 2007/0077015 A1 | 4/2007 | Aoki et al. |
| 2007/0202319 A1 * | 8/2007 | Bryan et al. ............... 428/323 |

FOREIGN PATENT DOCUMENTS

| | | |
|---|---|---|
| EP | 1231488 A2 | 8/2002 |
| EP | 1536252 A1 | 6/2005 |

OTHER PUBLICATIONS

Rahman et al., "Birefringence Compensation of Silica Waveguides," IEEE Photonics Technology Letters, vol. 17, No. 6, Jun. 2005, pp. 1205-1207.

Worhoff et al., "Birefringence Compensation Applying Double-Core Waveguiding Structures," IEEE Photonics Technology Letters, vol. 11, No. 2, Feb. 1999, pp. 206-208.

International Search Report in International Application No. PCT/EP2009/058368, dated Oct. 13, 2009.

French Search Report in French Application No. FR 0854488, dated Mar. 30, 2009.

International Preliminary Report on Patentability, PCT/EP2009/058368, Dated Feb. 10, 2011.

* cited by examiner

STRUCTURE OF A MICRONANOSTRUCTURE OPTICAL WAVE GUIDE FOR CONTROLLING BIREFRINGENCE

TECHNICAL FIELD

The invention relates to an optical waveguide structure in which birefringence is controlled. The structure comprises an optical waveguide supported by a substrate, the optical waveguide comprising at least one micronanostructured guide layer.

STATE OF THE ART

Optical waveguides are media for the transport of optical signals very widely used in optoelectronics. They nevertheless have the disadvantage that they are sensitive to the polarity of the light: optical waveguides are said to be birefringent.

Birefringence is conventionally defined as the difference between the effective refractive indices for the TE (transverse electric) and TM (transverse magnetic) polarisations:

$$B = n_{TE} - n_{TM}$$

By convention, in an optical circuit provided in a given plane, the TE and TM polarisation states are defined such that:
  TE corresponds to the electrical field parallel to the plane of the circuit and the magnetic field perpendicular to the plane of the circuit,
  TM corresponds to the magnetic field parallel to the plane of the circuit and the electrical field perpendicular to the plane of the circuit.

In optical waveguides there are mainly two types of birefringent processes: form birefringence and material birefringence.

Form birefringence, indicated by $B_{form}$, is due to the asymmetrical shape ratio of the cross-section of the waveguide. In fact when an optical waveguide has an arbitrary form ratio it does not propagate the two polarisation states of an optical signal, TE and TM, at the same speed unless the cross-section of the guide is strictly square. Polarisation dispersion of the optical mode then occurs within the optical guide.

Material birefringence, referred to as $B_{mat}$, is due to the material in which the waveguide is provided. Material birefringence may be intrinsic, as in the case of anisotropic materials, or be induced by the processes of waveguide manufacture. For example, when a waveguide is deposited on a substrate stresses may appear at the interface and thus give rise to an induced material birefringence process.

In general the dominant birefringence process is that associated with the form ratio of the guides so that $B_{form} \gg B_{mat}$. Form birefringence is therefore the main disadvantage which has to be overcome in order to control birefringence in waveguides.

Known waveguides are mainly structures comprising vertical stacks of thin layers.

Document [1] (the reference is given at the end of this description) describes a "double core" waveguide comprising a main core layer and a thin layer. In this waveguide the addition of the thin layer just below the main core layer compensates for the polarisation dispersion in the main core layer. The thin layer is selected in such a way that it is a few tens of nanometers thick and has a high refractive index, as well as birefringence of opposite sign to that of the main core layer. In the example illustrated in document [1], the thin layer is a layer of $Si_3N_4$ having a refractive index n~2 and the main core layer is SiON.

Double core waveguides can only compensate for mild birefringence (of the order of some $10^{-3}$, which is equivalent to values for material birefringence). The waveguide must therefore have an approximately square cross-section to prevent the appearance of form birefringence.

This is why the thickness of the thin layer is selected so that the sum of the thicknesses of the main core layer and the thin layer is approximately equal to the width of the waveguide.

Document [2] describes a multilayer waveguide comprising an alternation of layers of silica having a refractive index $n_b$ of depth $h_b$ and layers of doped silica having a refractive index $n_a$ of depth $h_a$, the central region of the waveguide being a layer which is twice as thick as the adjacent layers.

In this multilayer waveguide, the contrast between the refractive indices of the layers is very small ($\Delta n = 1.5\%$) and the thickness of each layer is 250 nm.

As in the double core waveguide previously described, the depth H and the width L of the waveguide are selected so that the cross-section of the waveguide has a form ratio very close to unity, i.e. an essentially square shape, because this multilayer waveguide can only compensate for mild birefringence (a few $10^{-4}$). It is therefore important not to create form birefringence within the waveguide.

In conclusion, the compensation for birefringence in the waveguides known in the prior art is, as we have seen above, limited.

Furthermore, in the field of optoelectronics it is beneficial to be able to incorporate a maximum number of optical devices on the same chip. Now this makes it necessary to achieve maximum miniaturisation of the optical circuits, resulting in miniaturisation of the cross-sections of the optical guides down to submicron dimensions. Now, as we have just seen, the waveguides in the prior art must have a substantially square cross-section to limit form birefringence. The depths of these waveguides, having values close to the widths of these guides, are of a few micrometers. These guides cannot therefore be used in the context of submicron integration.

In order to produce even more powerful optical or photon integrated circuits the inventors have therefore attempted to develop a waveguide which can compensate not only for material birefringence but also for form birefringence. The inventors have therefore attempted to develop a waveguide in which birefringence can be controlled regardless of the shape of the cross-section of the waveguide.

The inventors have also attempted to develop a waveguide which can control birefringence in both space, i.e. locally and/or throughout the waveguide, and temporally, i.e. to achieve dynamic in-situ control of birefringence in the guide.

The object of the invention is therefore to provide an optical waveguide which can control birefringence, and to do so regardless of the form ratio of the cross-section of the waveguide.

DESCRIPTION OF THE INVENTION

This object is accomplished through an optical waveguide structure comprising:
  a supporting substrate,
  an optical waveguide located on a surface of the supporting substrate, the optical waveguide comprising at least one guide layer having a refractive index $n_1$ intended to guide an optical wave in a direction of propagation parallel to the surface of the guide layer,
  the said structure being characterised in that the said at least one guide layer comprises at least one zone having a birefringence of value B, the said zone comprising voids provided in the thickness of the guide layer, the voids being filled with a fluid or material having a refractive index $n_2$ which is not the same as $n_1$ and being organised in at least two parallel rows, each row being in a plane essentially perpendicular to the surface of the guide layer and essentially parallel to the direction of propagation of the optical wave, each row extending over a distance equal to or longer than the wavelength of the optical wave which is to be propagated within the guide layer, the width of the voids being equal to or less than one tenth of the wavelength of the optical wave intended to be propagated within the guide layer, the width of a void being the maximum distance between the two opposite edges of a particular void present in a plane perpendicular to the direction of propagation of the optical wave, each void within one row being at a distance from an adjacent void equal to or less than one tenth of the wavelength of the optical wave intended to be propagated within the guide layer, the width of the voids in relation to the distance separating two adjacent voids in two adjacent rows and the refractive index $n_2$ of the fluid or material filling the voids being selected on the basis of the birefringence value B which it is desired to obtain according to the following formula:

$$B = \sqrt{\frac{1}{\frac{ff}{n_{H,TE}^2} + \frac{(1-ff)}{n_{B,TE}^2}} - \sqrt{n_{H,TM}^2 \times ff + n_{B,TM}^2 \times (1-ff)}}$$

ff being the filling factor for the material of refractive index $n_1$ and having a value between 0 and 1, the values 0 and 1 being excluded, $n_{H,TE}$ and $n_{H,TM}$ being the effective refractive indices of the TE mode and the TM mode of the guide layer of higher refractive index ("high") respectively, $n_{B,TE}$ and $n_{B,TM}$ being the effective refractive indices of the TE mode and the TM mode of the fluid or material filling the voids of lower refractive index ("low") respectively.

It will not be forgotten that as $n_1$ and $n_2$ are different, one will necessarily be higher and the other lower.

If the refractive index $n_2$ is strictly identical to the refractive index of the surroundings $n_{env}$ (where the structured guide layer is placed in a liquid or more generally in air or any gas), then $n_{B,TE}$ and $n_{B,TM}$ will be taken to be equal to $n_{env}$.

In accordance with the invention, it is specifically the choice of filling factor ff and the choice of fluid (liquid or gas) or material filling the voids which make it possible to achieve a controlled birefringence B.

It should be noted that the spaces between the voids and the interval between the rows (in the case of rows organised in a periodic manner), what we will call the structuring parameters, lie within the precise ranges of values necessary to obtain the desired birefringence B. The structuring parameters of the voids and/or the nature of the fluid or material filling the said voids will differ depending upon this desired value. It should be noted that the intention here is to control birefringence; this can be done in two ways: in an overall way and locally.

When it is desired to control the birefringence in an overall way the parameters in the formula above are altered so as to obtain compensated birefringence at the outlet from the waveguide in such a way that the two propagation modes TE and TM are detected at the same time, even if they do not have the same speed of propagation. For example, if the TE mode propagates within the guide structure with a particular delay in relation to the TM mode, it will then be necessary to delay the TM mode in such a way that the two TE and TM modes appear at the outlet from the guide layer.

When it is desired to control birefringence locally, the parameters in the formula are locally altered so that the two TE and TM modes propagate within the guide layer at the same speed. In order to do this the effective refractive indices must be strictly the same.

The interval between the rows is between 50 nm and 1 µm; the spacing between the voids is between 50 nm and 1 µm; the depth of the voids is between 10 nm and 1 µm.

As the structuring of the guide layer is provided within the thickness of the guide layer starting from one face of the said layer and as the dimensions of the voids and the spaces between the voids are between 50 nm and 1 µm, it is said that the guide layer has lateral micronanostructuring.

The voids are present in at least one zone of the guide layer in which it is desired to alter the birefringence of the guide layer. The voids can therefore be located in one or more specific zones of the guide layer or be present within the entire guide layer (the zone then corresponding to the guide layer as a whole). In other words the voids may be present over the full width of the guide layer and/or over the full length of the guide layer.

Refractive index $n_2$ is not the same as refractive index $n_1$. In general refractive index $n_1$ is selected to be greater than refractive index $n_2$ so that the optical wave remains confined within the material having refractive index $n_1$. For example, if the material having refractive index $n_1$ is silicon the material having refractive index $n_2$ may be selected from oxides (for example $SiO_2$, $TiO_2$ ...) or nitrides (for example $Si_3N_4$ ...).

Advantageously, the light wave which is intended to be propagated within the guide layer has a wavelength of between 400 nm and 10 µm.

Advantageously, the adjacent voids in adjacent rows are a distance apart which is equal to or less than one tenth of the wavelength of the optical wave which is intended to be propagated within the guide layer.

Advantageously, the distance between the adjacent voids in one row is constant.

Advantageously, the distance between the rows is constant.

It should be understood that when reference is made to the distance between adjacent rows it is the distance between the two directrix lines which is considered, each directrix line passing through the centre of the voids in each row. Thus it is possible for example to obtain a waveguide structure in which the guide layer comprises a set of voids arranged in a periodic manner.

Advantageously, at least one of the voids will be a slot extending in the direction of propagation of the optical wave. In this particular case at least one row may advantageously comprise a single void, this void being a slot which extends in the direction of propagation of the optical wave.

Advantageously, at least one of the voids is a hole having a circular or square cross-section.

Advantageously, the width of the voids varies within one row of voids.

According to a first variant, the variation in the width of the voids within the same row is constant.

According to another variant, the variation in the width of the voids within one row is periodical; for example, the variation may be a sinusoidal variation with an increase in the width followed by a decrease, etc.

Thus the structuring parameters of the guide layer may vary over the width of the length of the guide layer. In this case the refractive index profile is then locally altered. This alteration can for example be used to provide advanced passive/active optical functions within the waveguide (focuser, mode converter, switch, etc.).

Advantageously, the guide layer has a thickness which is equal to or less than 10 micrometers. More particularly, the guide layer may advantageously have a thickness of between 1 micrometer and 250 nanometers.

Advantageously, the voids have the same depth.

Advantageously, the voids are transverse voids. The voids are said to be transverse when they pass through the total thickness of the guide layer.

Advantageously, the guide layer comprising the voids is covered with a coating layer of material identical to the material filling the voids in the guide layer, having a refractive index $n_2$ which is not the same as $n_1$. For example, the material present in the voids may be the same material as the material of the supporting substrate.

Advantageously, the structure further comprises two conducting electrodes, a first electrode being located beneath the coating layer and a second electrode being placed above the coating layer. Preferably the two electrodes are placed close to the zone of the guide layer comprising the voids. Advantageously the electrodes may be electrically conducting or thermally conducting.

The invention also relates to a process for producing such an optical waveguide structure comprising a supporting substrate and an optical waveguide, the waveguide comprising at least one guide layer comprising at least one zone having a birefringence value of B. The process of production includes the following stages:

provision of a stack comprising a supporting substrate and at least one guide layer of a first material on one surface of the supporting substrate, structuring the said at least one guide layer in the said at least one zone by forming voids within the thickness of the guide layer, the voids being filled with the fluid or material having a refractive index $n_2$ which is not the same as $n_1$ and being organised in at least two parallel rows, each row being in a plane essentially perpendicular to the surface of the guide layer and essentially parallel to the direction of propagation of the optical wave within the guide layer, and each row extending over a distance equal to or longer than the wavelength of the optical wave which is intended to be propagated within the guide layer, the width of the voids being equal to or less than one tenth of the wavelength of the optical wave intended to be propagated within the guide layer, the width of a void being the maximum distance between the two opposite sides of one void present in a plane perpendicular to the direction of the optical wave, each void within a given row being at a distance from an adjacent void which is equal to or less than one tenth of the wavelength of the optical wave intended to be propagated within the guide layer, the width of the voids in relation to the distance separating two adjacent voids in two adjacent rows and the refractive index $n_2$ of the fluid or material filling the voids being selected in relation to the birefringence value B which it is desired to obtain in accordance with the following formula:

$$B = \sqrt{\frac{1}{\frac{ff}{n_{H,TE}^2} + \frac{(1-ff)}{n_{B,TE}^2}} - \sqrt{n_{H,TM}^2 \times ff + n_{B,TM}^2 \times (1-ff)}}$$

ff being the filling factor for the material of refractive index $n_1$ and having a value between 0 and 1, 0 and 1 being excluded, $n_{H,TE}$ and $n_{H,TM}$ being the effective refractive indices of the TE mode and the TM mode respectively of the guide layer of higher reflective index ("high"), $n_{B,TE}$ and $n_{B,TM}$ being the effective refractive indices of the TE mode and the TM mode respectively of the fluid or material of lower refractive index filling the voids ("low").

If the refractive index $n_2$ is strictly the same as the refractive index of the surroundings $n_{env}$ (in the case where the structured guide layer is located in a liquid or in the more general case in air or any gas), then $n_{B,TE}$ and $n_{B,TM}$ will be taken to be equal to $n_{env}$.

The guide layer may be structured by lithography, followed by etching of the said layer.

In a particular embodiment, after the structuring stage the process of production further comprises a stage of depositing a layer of coating on the structured guide layer, this coating layer having a refractive index which is different from that of the guide layer.

Advantageously, prior to the stage of depositing the coating layer on the structured guide layer, the process of production further comprises the stage of forming a first conducting electrode on the guide layer and following the stage of depositing the coating layer on the structured guide layer a stage of forming a second conducting electrode on the coating layer. The conducting electrodes may be electrically conducting or thermally conducting. The electrodes may for example be formed by depositing an electrically conducting layer. It is pointed out that the first electrode may be formed before or after the guide layer has been structured.

According to one embodiment, the supporting substrate comprises a substrate having a refractive index $n_3$ and a layer having a refractive index $n_4$ in contact with the guide layer, $n_4$ being smaller than the refractive index $n_1$ of the guide layer. Advantageously, the supporting substrate comprises a silicon substrate and a silicon dioxide layer, and the guide layer is a layer of silicon.

BRIEF DESCRIPTION OF THE DRAWINGS

The invention will be better understood and other advantages and features thereof will be apparent from a reading of the following description provided by way of a non-limiting example accompanied by appended drawings in which.

DETAILED DESCRIPTION OF PARTICULAR EMBODIMENTS

Figure 1:
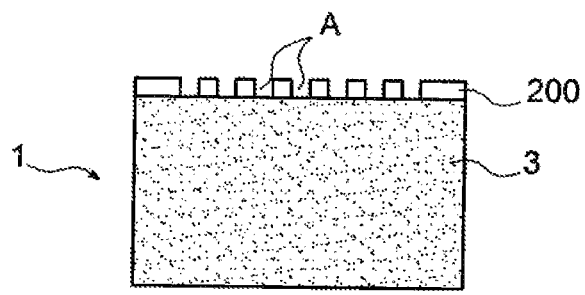
FIG. 1 illustrates an embodiment of an optical waveguide structure according to the invention seen in transverse cross-section.

One embodiment of an optical waveguide structure 1 according to the invention is illustrated in FIG. 1. In FIG. 1 structure 1 comprises an optical guide, comprising a single structured guide layer 200 with an array of periodic voids A lying on a supporting substrate 3.

The waveguide of the waveguide structure according to the invention may also comprise several stacked layers, at least one of these layers comprising lateral nanostructuring.

We will now describe an embodiment of a waveguide structure according to the invention based on an SOI (silicon on insulator) substrate.

Figure 2A:
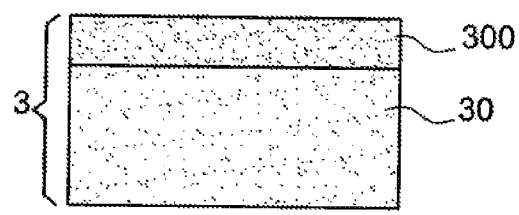
FIGS. 2A to 2D illustrate the stages in the process of fabricating an optical waveguide structure according to a first embodiment of the invention.

On one surface of a silicon substrate 30 there is deposited a layer of silicon dioxide 300 approximately 1 micrometer thick (FIG. 2A).

Figure 2B:
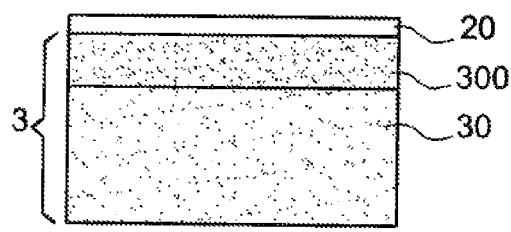

A layer of polycrystalline silicon 20 is then deposited upon silicon dioxide layer 300. This silicon layer 20 has a thickness of between 200 nm and 1 µm (FIG. 2B).

Polycrystalline silicon layer 20 is then structured: a structured layer 200 is then obtained. The waveguide may be laterally structured in several geometries (in the form of slots or holes), the structuring being mixed (holes and slots), periodic or non-periodic. In this embodiment the structuring is an array of periodic parallel slots created throughout the thickness of polycrystalline silicon layer 20. The structuring is achieved for example by lithography of layer 20, followed by an RIE or ICP etch. The lithography may be carried out using UV, deep UV, a focused ion beam or a beam of electrons.

Figure 2C:
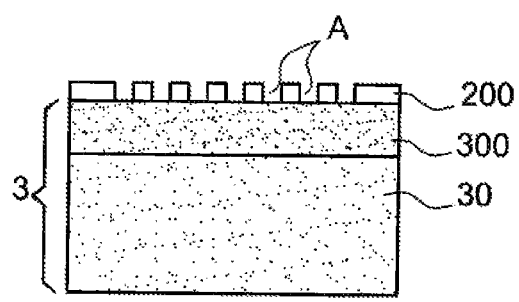

The voids within structured guide layer 200 may be left empty (FIG. 2C), but they may also be filled. The voids in the structured guide layer may thus be filled with a solid or a fluid, the fluid being a liquid or a gas. The gas may for example be ambient air.

Figure 2D:
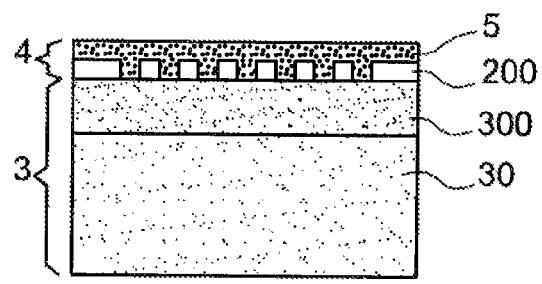

In the example illustrated in FIG. 2D structured guide layer 200 is covered by a coating layer 5 which fills the slots in the guide layer. For example a coating layer 5 of silicon dioxide having a thickness of 1.5 micrometers is deposited on structured guide layer 200, then this coating layer 5 is planarised by chemical and mechanical polishing. The final thickness of coating layer 5 may be controlled and adjusted to be between 100 nm and 1 micrometer. A waveguide structure comprising a supporting substrate 3 and a waveguide 4 comprising a structured guide layer 200 and a coating layer 5 is thus obtained.

In the embodiment illustrated in FIG. 2D coating layer 5 is a material identical to the material in the layer underlying the guide layer, i.e. layer 300. It may however be decided to deposit a coating layer of a material having a different refractive index (for example a lower refractive index) from that of the guide layer (for example a resin or a dielectric material).

According to another embodiment a silicon layer of refractive index n=3.5 and thickness 250 nm is applied to a layer of silica which has itself been deposited on a silicon substrate. An array of slots 1D is etched throughout the thickness of the silicon layer at intervals of 120 nm. The slots in the array are then filled with for example silicon nitride $Si_3N_4$ having a refractive index n=2.2. An array having a silicon filling factor of 85% is then obtained. Such a micronanostructured waveguide is able to act as a waveguide for a light ray having a wavelength of 1.55 µm.

Figure 3A:
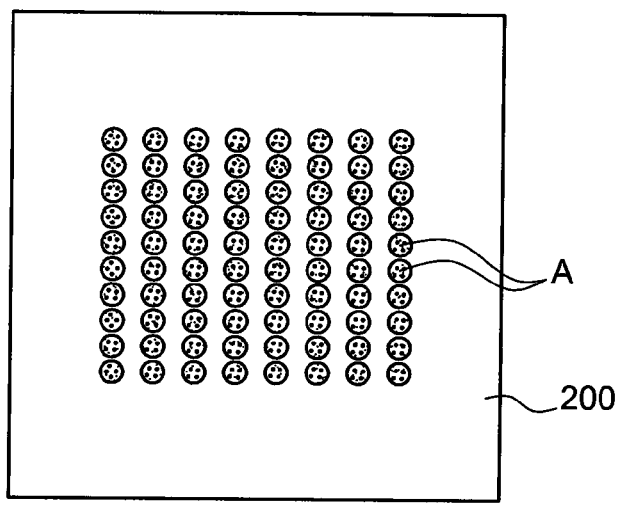
FIGS. 3A and 3B illustrate a view from above of the structure illustrated in FIG. 2C, in which the structuring of the guide layer is localised or extends over the entire length of the guide layer respectively.
Figure 3B:
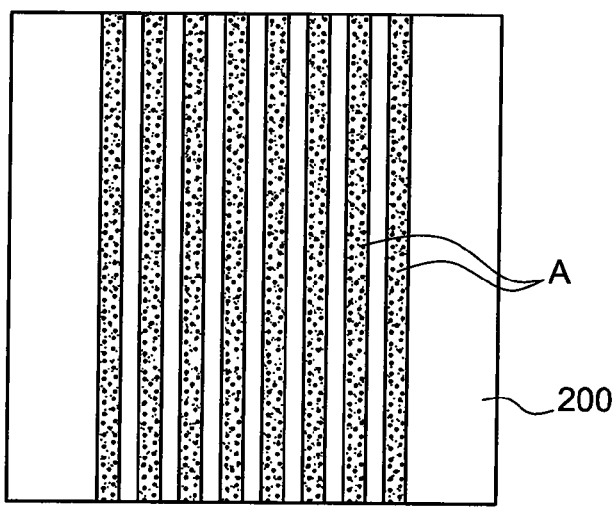

The structuring of the guide layer may be local (FIG. 3A) or may extend over the entire length of the layer (FIG. 3B). These FIGS. 3A and 3B constitute a view of the structure illustrated in FIG. 2C, from above: structured guide layer 200 together with the underlying substrate (layer 300) and voids A may be seen.

Depending upon the structuring parameters (spacing between the voids, number of voids, etc.) the birefringence of the waveguide may be increased, decreased or annulled, but once the structuring has been performed the birefringence of the waveguide is fixed. This birefringence can however be altered by changing material present in the voids in the guide layer. It is therefore preferable to use fluid to fill and drain the voids more easily.

Figure 4:
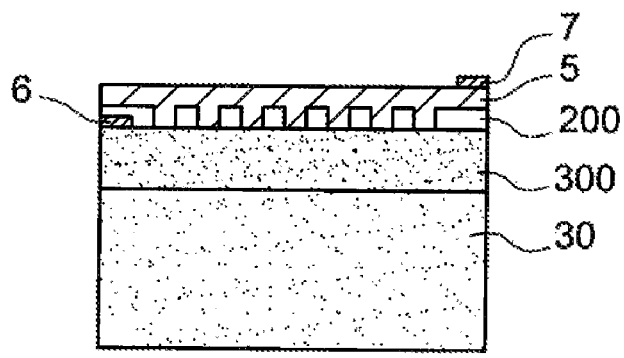
FIG. 4 illustrates a waveguide structure comprising two electrodes, seen in transverse cross-section.

It is also possible to alter the birefringence of the waveguide dynamically: a waveguide which can be reconfigured over the course of time is then obtained. In order to do this two electrodes (6, 7) are located on either side of coating layer 5 (FIG. 4) so as to dynamically alter the refractive index of the coating layer and/or the opto-geometrical parameters of the structuring of structured guide layer 200. The alteration may be performed electro-optically by applying an electric voltage between the electrodes (6, 7) (in order to change the refractive index) or thermally by producing local heating between the electrodes (the change in heat causes expansion or shrinkage of the guide layer and alters the spacing between the voids). It will be noted that in this example coating layer 5 is a material which is not the same as that of layer 300 underlying structured guide layer 200.

According to another embodiment several pairs of electrodes may also be located along the structured waveguide on either side of the coating layer to permit dynamic reconfiguration of the waveguide through an overall or local alteration of the opto-geometrical parameters of the structured guide layer.

A second embodiment of an optical waveguide structure will be described.

Figure 5A:
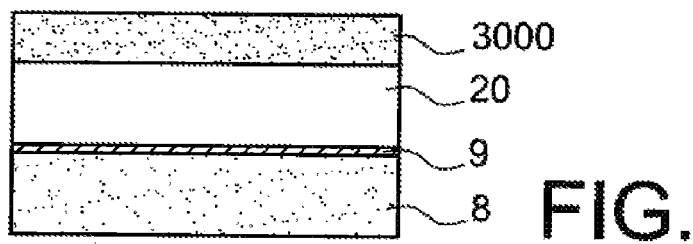
FIGS. 5A to 5D illustrate stages in the process of fabricating an optical waveguide structure according to a second embodiment of the invention.

A layer of silicon dioxide 3000 is deposited on a III-V layer 20 having a III-V heterostructure comprising a stack of III-V substrate 8, a III-V sacrificial layer 9 and a III-V layer 20 (FIG. 5A). Materials III-V forming the heterostructure may for example be GaAs or InP.

Figure 5B:
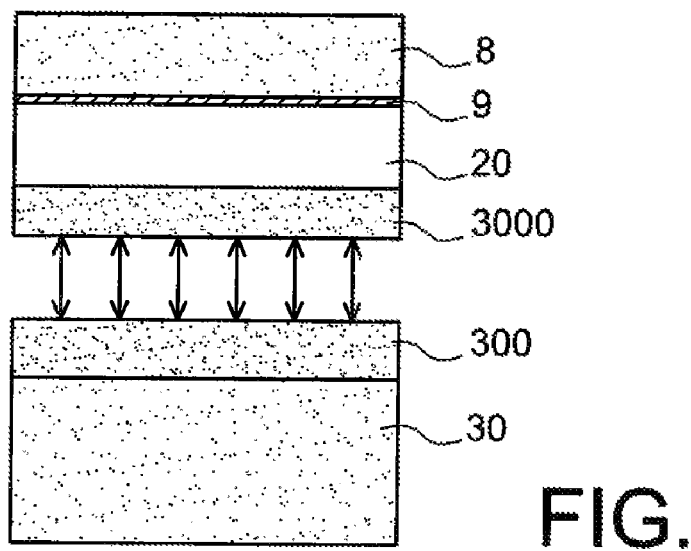

This heterostructure is placed on a stack comprising a silicon substrate 30 and a layer of silicon dioxide 300 by a process of bonding by molecular adhesion, the adhesion taking place between the silicon dioxide layer 3000 of the heterostructure and the silicon dioxide layer 300 of the stack (FIG. 5B).

Figure 5C:
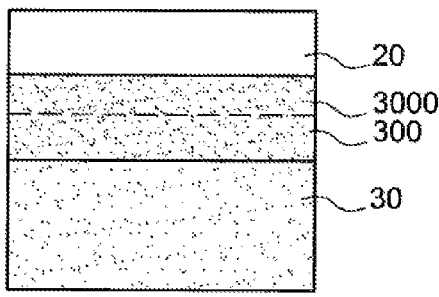

Then III-V substrate 8 is removed by grinding and polishing, followed by selective chemical etching down to sacrificial layer 9. Sacrificial layer 9 is then removed by selective chemical etching. The surface of III-V layer 20 may be planarised (FIG. 5C).

Figure 5D:
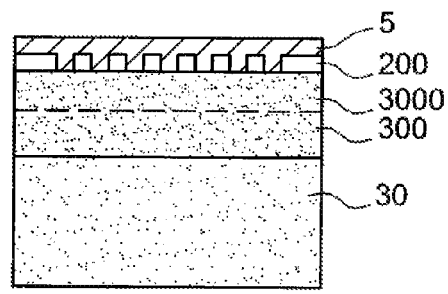

Finally voids are made throughout the thickness of III-V layer 20, for example by lithography followed by an RIE or ICP etch of the III-V layer. The voids may for example be an array of periodic parallel slots. A structured layer 200 is then obtained. The voids are then filled and structured III-V layer 200 is covered with a coating layer 5 of different material (for example silicon dioxide, silicon nitride or an optical resin which is transparent at the working wavelength, etc.) (FIG. 5D).

Birefringence B is obtained using a formula which depends on a factor for the material of refractive index $n_1$ (filling factor ff) and the refractive indices $n_{1,TE}$, $n_{1,TM}$, $n_{2,TE}$ and $n_{2,TM}$. This formula is derived from an analytical model used to model the behaviour of slot structures of the thin layer type.

In this analytical model, we have:
for the TM polarisation:

$$n_{eff,TM} = \sqrt{n_{H,TM}^2 \times ff + n_{B,TM}^2 \times (1-ff)} + a \times \left(\frac{\Lambda}{\lambda}\right)$$

for the TE polarisation:

$$n_{eff,TM} = \sqrt{\frac{1}{\frac{ff}{n_{H,TE}^2} + \frac{(1-ff)}{n_{B,TE}^2}}} + a \times \left(\frac{\Lambda}{\lambda}\right)$$

where $$a \times \left(\frac{\Lambda}{\lambda}\right)$$

is a correction term of the first order, a being a constant, $\Lambda$ being the period and $\lambda$ being the wavelength, $n_{eff,TM}$ and $n_{eff,TE}$ being the effective refractive indices for the TM mode and the TE mode respectively, $n_{H,TM}$ and $n_{H,TE}$ being the high refractive indices for the TM mode and TE mode respectively, $n_{B,TM}$ and $n_{B,TE}$ being the low refractive indices for the TM mode and TE mode respectively.

It will not be forgotten that as $n_1$ and $n_2$ are not the same there will necessarily be one which will be quite "high" and the other "low".

In the case where refractive index $n_2$ is strictly the same as the refractive index of the surroundings $n_{env}$ (in the situation where the structured guide layer is placed in a liquid or more generally in air or in any gas), then $n_{B,TE}$ and $n_{B,TM}$ will be taken to be equal to $n_{env}$.

Birefringence B is thus obtained:

$$B = n_{eff,TE} - n_{eff,TM} = \sqrt{\frac{1}{\frac{ff}{n_{H,TE}^2} + \frac{(1-ff)}{n_{B,TE}^2}}} - \sqrt{n_{H,TM}^2 \times ff + n_{B,TM}^2 \times (1-ff)}$$

The structuring parameters are linked to the filling factor ff in a manner which is in itself known.

By way of example, for a guide structured in just one dimension the width of a void is equal to $(1-ff) \times \Lambda$ and the spacing between two adjacent voids is $ff \times \Lambda$, $\Lambda$ being the interval for the structure guide array.

By way of illustration, and to demonstrate that a structured waveguide according to the invention can effectively control birefringence, we have carried out digital calculations on the basis of a waveguide of micrometer size comprising lateral nanostructuring.

Waveguide structure 1 considered in this example comprises a layer of silicon having a thickness of 320 nm, a width of 5 μm and a length of 300 μm, which forms the waveguide, and a substrate 3 (FIG. 1). The refractive index of the structured silicon layer is 3.5. This silicon layer comprises an array of periodic slots A parallel to the length of the layer, provided throughout the thickness of the layer and organised having an interval of 100 nm. Substrate 3 may for example comprise a silicon substrate and a layer of silica having a thickness of 2 μm. The assembly formed of this substrate and a silicon layer of 220 nm then forms a micronanostructured SOI substrate.

Layer 200 structured in this way is immersed in a uniform medium of silicon nitride $Si_3N_4$ having a refractive index of 2.2.

In order to carry out the digital calculations we used commercial simulation software based on the method of the propagation of optical beams (BeamProb® software from Rsoft). This software alters the ratio between the width of the slots and the interval between the slots in the structured layer. In our example, altering the ratio between the width of the slots and the interval alters the silicon filling factor ($ff_{Si}$) for the structural layer. The effective refractive indices for the two polarisation states TE and TM were measured for each ratio.

To measure these effective refractive indices a Gaussian beam is generated at one of the two edges of structured layer 200 in such a way that the beam propagates in both a direction parallel to the plane of the layer and one parallel to the slots in the layer.

The beam is selected in such a way that its lateral extension is less than the width of the structured layer, so as to provide optimum coverage in optical mode. In this example the beam has a wavelength of around 1300 nm.

Thus, in this example, $n_1=3.5$ and $n_2=2.2$. As a consequence, $n_1$ is $n_H$ and $n_2$ is $n_B$ and we have:

$$B = \sqrt{\frac{1}{\frac{ff}{n_{H,TE}^2} + \frac{(1-ff)}{n_{B,TE}^2}}} - \sqrt{n_{H,TM}^2 \times ff + n_{B,TM}^2 \times (1-ff)}$$

Figure 6:
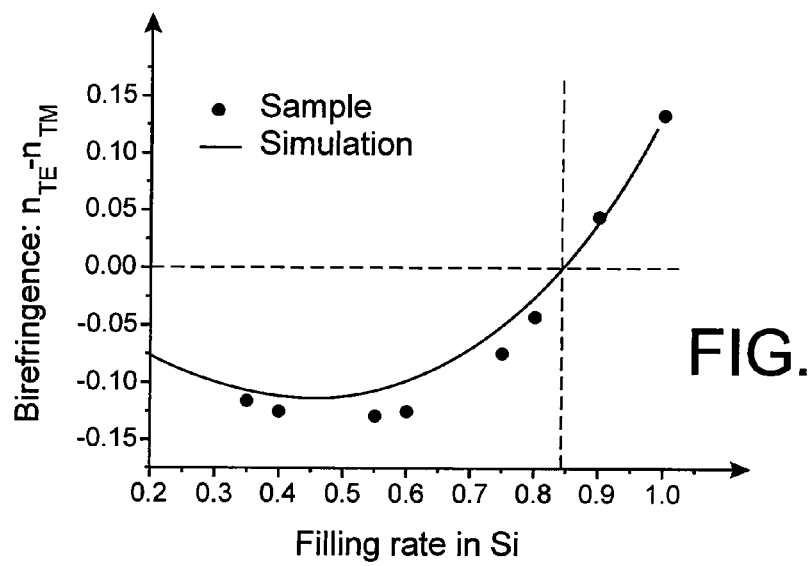
FIG. 6 is a graph showing the birefringence in relation to the level of filling in the silicon calculated through simulation using software (RSOFT) and using an actual sample.

FIG. 6 shows the calculations for birefringence in relation to the level of silicon filling through simulation using software (RSOFT) (straight line) and calculations based on an actual sample (circles). It will be seen that the results obtained from simulation and the real sample (obtained using the analytical model) are close. The analytical model is therefore a good way of determining the filling ratio in relation to the birefringence which it is desired to obtain.

It will also be seen in FIG. 6 that birefringence B equal to 0 may be obtained when the sample under investigation has a silicon filling factor of 85%.

Figure 7:
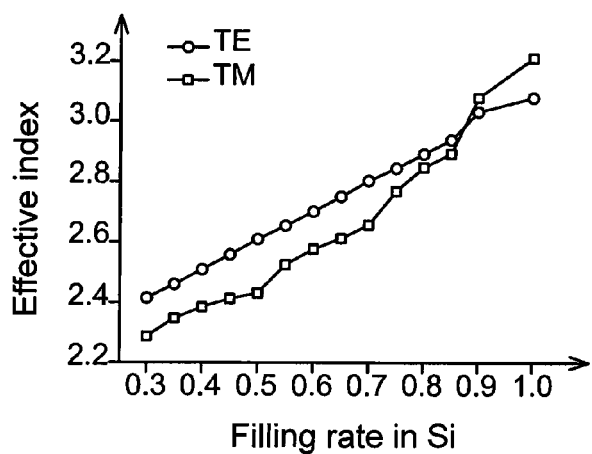
FIG. 7 is a graph showing the effective refractive indices of the TE and TM polarisation states in relation to the level of filling in the silicon of a waveguide structure according to the invention.

FIG. 7 shows the effective calculated refractive indices for the two polarisation states TE and TM in relation to the silicon filling factor for the structured layer.

Consulting the graph in FIG. 7 it will be seen that before the layer was laterally structured (i.e. for $ff_{Si}=100\%$) the difference in the refractive indices between the two states TE and TM was more than 0.1, the effective refractive index for the TE mode being 3.21976 and the effective refractive index for the TM mode being 3.0863. The non-structured waveguide therefore shows significant birefringence. This is explained by the fact that the waveguide has great asymmetry in its cross-section.

With lateral nanostructuring the calculations for refractive indices show that starting from a silicon filling factor of 100% down to a silicon filling factor of approximately 87% the birefringence of the guide is reduced until it is completely compensated for at $ff_{Si}=87\%$. A filling factor of 87% corresponds in our example to slots spaced 13 nm apart with an interval of 100 nm, the slots being filled with silicon nitride.

With a filling level of 87% we therefore end up with a succession of periodic silicon "bars" 87 nm wide and silicon nitride "bars" 13 nm wide.

Below 87% the birefringence is reversed and reaches its optimum value (>0,1) with a silicon filling factor of 50%.

It will also be seen from the graph in FIG. 7 that the nanostructuring of the layer has a greater effect on the effective refractive index of the TE polarisation.

With regard to the TM polarisation the electrical field experiences the nanostructuring as a homogeneous medium having an average refractive index whereas with regard to the TE polarisation the distribution of the field is locally disturbed. The amplitude of the electrical field is a maximum in the zone of low refractive index, in the case in point in the nitride; it is reduced by a factor of approximately $\in_{Si}/\in_{Si3N4}$ in the zone having a high refractive index, i.e. in the silicon. This disturbance of the electrical field and its location, mainly in the zones where n is low, are two factors which are responsible for the great change in the effective refractive index of the TE polarisation as the filling factor $ff_{Si}$ decreases.

In conclusion, an optical waveguide structure according to the invention can effectively control birefringence, that is decrease, annul or reverse the birefringence, in a specific manner. This control is brought about by the choice of the lateral structuring parameters for the guide layer of the waveguide structure. Depending on the choice made the birefringence can be controlled over a wide range.

One of the advantages of the waveguide structure according to the invention is that the waveguide, i.e. the layer or layers laid on the supporting substrate, may have any cross-section. Thus birefringence may be controlled in waveguides having any cross-section and form ratio (rectangular, square, circular, etc., waveguides). It is therefore possible to fabricate planar optical waveguides of submicron depth which can easily be incorporated into optical circuits, the substrate for the optical circuits forming the supporting substrate for the waveguides. The waveguides according to the invention may thus be of small size.

These waveguides can be used in optoelectronic components to integrate complex functions for managing optical beams such as multiplexing, demultiplexing, modulation, spectral routing, etc., in a compact way on the same chip. These functions may also be dedicated to very short distance optical links on the millimeter scale (such as for example for communication within a chip), as well as over very long distances, of the order of several kilometers (for example for communication in a metropolitan area network).

BIBLIOGRAPHY

[1] K. Wörhoff, B. J. Offrein, P. V. Lambeck, G. L. Bona, and A. Driessen, "Birefringence Compensation Applying Double-Core Waveguiding Structures", IEEE Photon. Technol. Lett., 11, 2, pp. 206-208 (1999).

[2] B. M. A. Rahman, N. Somasiri, and K. T. V. Grattan, "Birefringence compensation of silica waveguides", IEEE Photon. Technol. Lett., 17, 6, pp 1205-1207 (2005).

The invention claimed is:

1. Optical waveguide structure, comprising:
a supporting substrate,
an optical waveguide located on a surface of the supporting substrate, the optical waveguide comprising at least one guide layer having a refractive index $n_1$ intended to guide an optical wave in a direction of propagation parallel to the surface of the guide layer,
wherein the said at least one guide layer comprises at least one zone having a birefringence of value B, the said zone comprising voids provided in the thickness of the guide layer, the voids being filled with a fluid or material having a refractive index $n_2$ which is not the same as $n_1$ and being organised in at least two parallel rows, each row being in a plane essentially perpendicular to the surface of the guide layer and essentially parallel to the direction of propagation of the optical wave, each row extending over a distance equal to or longer than the wavelength of the optical wave which is to be propagated within the guide layer,
the width of the voids being equal to or less than one tenth of the wavelength of the optical wave intended to be propagated within the guide layer, the width of a void being the maximum distance between the two opposite edges of a particular void present in a plane perpendicular to the direction of propagation of the optical wave,
each void within one row being at a distance from an adjacent void equal to or less than one tenth of the wavelength of the optical wave intended to be propagated within the guide layer,
the width of the voids in relation to the distance separating two adjacent voids in two adjacent rows and the refractive index $n_2$ of the fluid or material filling the voids being selected on the basis of the birefringence value B which it is desired to obtain according to the following formula:

$$B = \sqrt{\frac{1}{\frac{ff}{n_{H,TE}^2} + \frac{(1-ff)}{n_{B,TE}^2}}} - \sqrt{n_{H,TM}^2 \times ff + n_{B,TM}^2 \times (1-ff)}$$

ff being the filling factor for the material of refractive index $n_1$ and having a value between 0 and 1, the values 0 and 1 being excluded, $n_{H,TE}$ and $n_{H,TM}$ being the effective refractive indices of the TE mode and the TM mode respectively of the guide layer of higher refractive index, $n_{B,TE}$ and $n_{B,TM}$ being the effective refractive indices of the TE mode and the TM mode respectively of the fluid or material filling the voids of lower refractive index.

2. Optical waveguide structure according to claim 1, wherein the light wave which is to be propagated within the guide layer has a wavelength of between 400 nm and 10 μm.

3. Optical waveguide structure according to claim 1, wherein the adjacent voids in adjacent rows are spaced apart by a distance equal to or less than one tenth of the wavelength of the optical wave which is intended to be propagated within the guide layer.

4. Optical waveguide structure according to claim 1, wherein the distance between the adjacent voids in the same row is constant.

5. Optical waveguide structure according to claim 1, wherein the distance between the rows is constant.

6. Optical waveguide structure according to claim 1, wherein at least one of the voids is a slot extending in the direction of propagation of the optical wave.

7. Optical waveguide structure according to claim 6, wherein at least one row comprises a single void, this void being a slot which extends in the direction of propagation of the optical wave.

8. Optical waveguide structure according to claim 1, wherein at least one of the voids is a hole having a circular or square cross-section.

9. Optical waveguide structure according to claim 1, wherein the width of the voids varies within the same row of voids.

10. Optical waveguide structure according to claim 9, wherein the variation in the width of the voids within the same row is constant.

11. Optical waveguide structure according claim 9, wherein the variation in the width of the voids within the same row is periodic.

12. Optical waveguide structure according to claim 1, wherein the guide layer has a thickness of or less than 10 micrometers.

13. Optical waveguide structure according to claim 1, wherein the guide layer has a thickness of between 1 micrometer and 250 nanometers.

14. Optical waveguide structure according claim 1, wherein the voids have the same depth.

15. Optical waveguide structure according to claim 1, wherein the voids are transverse voids.

16. Optical waveguide structure according to claim 1, wherein the guide layer comprising the voids is covered by a coating layer of a material identical to the material filling the voids in the guide layer having a refractive index $n_2$ which is different from $n_1$.

17. Optical waveguide structure according to claim 16, further comprising two conducting electrodes, a first electrode being placed beneath the coating layer and a second electrode being placed above the coating layer.

18. Process for the production of an optical waveguide structure according to claim 1, the waveguide structure comprising a supporting substrate and an optical waveguide, the waveguide comprising at least one guide layer comprising at least one zone having a birefringence value B, the said process of production comprising the following stages:

provision of a stack comprising a supporting substrate and at least one guide layer of a first material on one surface of the supporting substrate, structuring the said at least one guide layer in the said at least one zone by forming voids within the thickness of the guide layer, the voids being filled with the fluid or material having a refractive index $n_2$ which is not the same as $n_1$ and being organised in at least two parallel rows, each row being in a plane essentially perpendicular to the surface of the guide layer and essentially parallel to the direction of propagation of the optical wave within the guide layer, and each row extending over a distance equal to or longer than the wavelength of the optical wave which is intended to be propagated within the guide layer, the width of the voids being equal to or less than one tenth of the wavelength of the optical wave intended to be propagated within the guide layer, the width of a void being the maximum distance between the two opposite sides of one void present in a plane perpendicular to the direction of the optical wave, each void within a given row being at a distance from an adjacent void which is equal to or less than one tenth of the wavelength of the optical wave intended to be propagated within the guide layer, the width of the voids in relation to the distance separating two adjacent voids in two adjacent rows and the refractive index $n_2$ of the fluid or material filling the voids being selected in relation to the birefringence value B which it is desired to obtain in accordance with the following formula:

$$B = \sqrt{\frac{1}{\frac{ff}{n_{H,TE}^2} + \frac{(1-ff)}{n_{B,TE}^2}} - \sqrt{n_{H,TM}^2 \times ff + n_{B,TM}^2 \times (1-ff)}}$$

ff being the filling factor for the material of refractive index $n_1$ and having a value between 0 and 1, 0 and 1 being excluded, $n_{H,TE}$ and $n_{H,TM}$ being the effective refractive indices of the TE mode and the TM mode respectively of the guide layer of higher reflective index, $n_{B,TE}$ and $n_{B,TM}$ being the effective refractive indices of the TE mode and the TM mode respectively of the fluid or material filling the voids of lower refractive index.

19. Process for the production of an optical waveguide structure according to claim 18, further comprising a stage of depositing a coating layer on the guide layer, the said coating layer having a refractive index which is different from that of the guide layer, after the structuring stage.

20. Process for the production of an optical waveguide structure according to claim 19, further comprising a stage of forming a first conducting electrode on the guide layer before the stage of depositing the coating layer on the guide layer, and after the stage of depositing the coating layer on the guide layer a stage of forming a second conducting electrode on the coating layer.

21. Process for the production of an optical waveguide structure according to claim 18, in which the supporting substrate comprises a substrate having a refractive index $n_3$ and a layer having a refractive index $n_4$ in contact with the guide layer, $n_4$ being less than the refractive index $n_1$ of the guide layer.

22. Process for the production of an optical waveguide structure according to claim 21, wherein the supporting substrate comprises a silicon substrate and a layer of silicon dioxide, and the guide layer is a layer of silicon.

* * * * *